(12) United States Patent
Pilla et al.

(10) Patent No.: US 11,840,454 B2
(45) Date of Patent: Dec. 12, 2023

(54) HOLLOW POROUS SILICON-CONTAINING STRUCTURES AND METHOD OF FORMATION

(71) Applicant: CLEMSON UNIVERSITY, Clemson, SC (US)

(72) Inventors: Srikanth Pilla, Clemson, SC (US); Morteza Sabet, Clemson, SC (US); Apparao M. Rao, Clemson, SC (US); Nancy Chen, Clemson, SC (US)

(73) Assignee: CLEMSON UNIVERSITY, Clemson, SC (US)

( * ) Notice: Subject to any disclaimer, the term of this patent is extended or adjusted under 35 U.S.C. 154(b) by 0 days.

(21) Appl. No.: 17/525,497

(22) Filed: Nov. 12, 2021

(65) Prior Publication Data

US 2022/0153597 A1    May 19, 2022

Related U.S. Application Data

(60) Provisional application No. 63/113,399, filed on Nov. 13, 2020.

(51) Int. Cl.
| | | |
|---|---|---|
| *C01B 33/20* | (2006.01) | |
| *C01B 33/149* | (2006.01) | |
| *H01M 4/86* | (2006.01) | |
| *H01M 4/38* | (2006.01) | |
| *B82Y 30/00* | (2011.01) | |

(52) U.S. Cl.
CPC ............ *C01B 33/149* (2013.01); *C01B 33/20* (2013.01); *H01M 4/386* (2013.01); *H01M 4/8626* (2013.01); *B82Y 30/00* (2013.01); *C01P 2004/45* (2013.01); *C01P 2006/12* (2013.01); *C01P 2006/14* (2013.01)

(58) Field of Classification Search
CPC .............................. C01B 33/20; C01B 33/149
See application file for complete search history.

(56) References Cited

U.S. PATENT DOCUMENTS

| | | | |
|---|---|---|---|
| 2015/0064093 A1* | 3/2015 | MacLachlan | .......... B01J 20/103 423/335 |
| 2021/0273221 A1* | 9/2021 | Yan | ....................... H01M 4/366 |

FOREIGN PATENT DOCUMENTS

| | | | | |
|---|---|---|---|---|
| CN | 106374088 A | * | 2/2017 | ........ H01M 10/0525 |
| WO | WO-2012151688 A1 | * | 11/2012 | .............. B01J 20/10 |

OTHER PUBLICATIONS

Kuang et al (Cellulose II nanocrystal: a promising bio-template for porous or hollow nano SiO2 fabrication, Cellulose (2020) 27:3167-3179).*

(Continued)

*Primary Examiner* — Jun Li
(74) *Attorney, Agent, or Firm* — DORITY & MANNING, P.A.

(57) ABSTRACT

Methods for synthesis of high surface area porous silicon-based materials and structures that can be formed according to the methods are described. Methods are scalable and capable of producing large quantities of the high surface area materials with high efficiency. The high surface area products can be in the form of a 3D network of interconnected arms or quills with multimodal porosity including high level pores between and among arms, hollow cores of the arms of the network, and pores through the walls of the arms of the network.

16 Claims, 14 Drawing Sheets

(56) References Cited

OTHER PUBLICATIONS

Wan (Bacterial cellulose-templated synthesis of freestanding silica nanotubes with a three-dimensional network structure, RSC Adv., 2015, 5, 48875-48880).*
Machine translation of Zhou et al. (CN106374088A), publication date Feb. 1, 2017.*
Fu et al, Fabrication of hollow silica nanorods using nanocrystalline cellulseo as templates, BioRes. 7(2), 2319-2329, 2012.*

* cited by examiner

HOLLOW POROUS SILICON-CONTAINING
STRUCTURES AND METHOD OF
FORMATION

CROSS REFERENCE TO RELATED APPLICATION

This application claims filing benefit of U.S. Provisional Patent Application Ser. No. 63/113,399, having a filing date Nov. 13, 2020, entitled "Hollow Porous Silicon Structures and Method of Formation," which is incorporated herein by reference in its entirety.

STATEMENT REGARDING FEDERALLY SPONSORED RESEARCH OR DEVELOPMENT

This invention was made with government support under Grant No. 80NSSC18M0033, awarded by NASA. The government has certain rights in the invention.

BACKGROUND

Highly porous materials with dimensions on the nanometer scale have shown desirable characteristics in a plurality of fields including energy storage, nonlinear optics, luminescence, catalysis, solar energy conversion, biological detection, lasers, optical fibers, sensors, drug delivery, and cosmetics, as well others. There is great interest in the development of high surface area silicon-based materials as silicon is environmentally benign and silicon materials can be effectively used in a wide variety of different applications and industries.

Silicon-containing porous materials are of great interest as high-performance negative electrode materials, as silicon can exhibit atheoretical gravimetric capacity of about 4200 mAh/g as well as moderate potential vs. Li/Li+, low cost, and environmental benignancy. The primary challenge to achieving a stable performance of silicon-based anodes originates from the large volume change of silicon (>300%) occurring during the insertion/extraction processes of lithium ions. Unfortunately, such repeated expansion and contraction result in the pulverization of anode active particles, leading to the loss of electrical contact between anode active particles and the current collector. Even given the need for the resolution of such issues, the silicon battery sector is expected to realize an extremely robust compound annual growth rate well into the future.

In addition to the battery sector, the agriculture sector is also expected to see increased use of porous silicon-based materials in sensors and monitoring devices and as nanoscale carriers. The potential for the use of porous silicon-based structures in the medical sector (e.g., therapeutics, pharmaceuticals) and in the oil and gas markets (including drilling, production, exploration, early oil projects, shale gas and refining), as a membrane material in the water and wastewater treatment industries, in concrete manufacturing, as well as in other technologies, is expected to continue to grow.

Unfortunately, it has proven difficult to obtain silicon-based nanostructures in a large-scale production by traditional formation methods. For instance, approaches have been examined based on the use of one-dimensional (1D) templates to form high surface area silicon-based materials. However, these methods have had scalability issues due to limitations in preparing the synthetic templates and complex reactions for creating the silicon-based nanostructures.

What are needed in the art are cost-effective, environmentally friendly formation methods for forming porous silicon-based structures. The ability to use such methods to produce porous structures with enhanced porosity and pore volume would be of great benefit in the art.

SUMMARY

According to one embodiment, disclosed are methods for forming porous silicon-based structures. A method can include dispersing a template material in a reaction medium. Upon the dispersal, the template material can self-aggregate within the medium to form a three-dimensional (3D) interconnected network. A method can also include combining a silicon-containing precursor material and a surfactant with the template material under conditions such that the silicon-containing precursor sorbs to the surface of the 3D interconnected network (e.g., physisorption or chemisorption). During or following the sorption of the silicon-containing precursor material to the template material, the silicon-containing precursor can undergo hydrolysis and condensation reactions in a scalable sol-gel process to form a layer of silicate gel on the 3D interconnected network and can provide a 3D silicate structure that defines a plurality of interconnected arms or quills. The silicate gel can be dehydrated using conventional oven drying or freeze drying. A nearly complete silica (e.g., silicon dioxide, $SiO_2$) structure can be realized from the dehydrated silicate by applying a thermal treatment method. During thermal treatment, the template material can be removed or can be further processed to form a coating layer on the 3D silica structure (e.g., a carbon coating layer). In either case, a 3D silica structure can be formed that can include arms having a quill-like shape (also referred to herein as nano-quills) with a hollow core surrounded by a porous wall, with both the hollow core and the pores of the wall having a dimension on the nanometer scale. In some embodiments, a formation method can also include reducing at least a portion of the silica to form a high surface area porous 3D structure including silicon.

Also disclosed is a 3D structure including an interconnected network that can be formed by the methods. A 3D structure can include a plurality of interconnected arms. Arms of the interconnected network can include arms that include a hollow core surrounded by a porous wall. Individual arms can be quite long, for instance, on a micrometer scale, with a wall thickness on the nanometer scale. The hollow core and the pores through the wall can have a size on the nanometer scale. For instance, a hollow core can have a cross-sectional dimension of about 500 nm or less and an individual pore can have an opening of about 10 nm or less. The walls of the 3D interconnected network can include a porous silicon-based material, e.g., one of more types of silicon oxide, elemental silicon, or a mixture thereof and, in some embodiments, can include a coating layer on the silicon-based material, e.g., a conformal carbon coating on the surface of the network.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

10D presents the x-ray diffraction results of the materials of 3D networks following reduction of silica of the network to a silicon-containing material.

Figure 11:
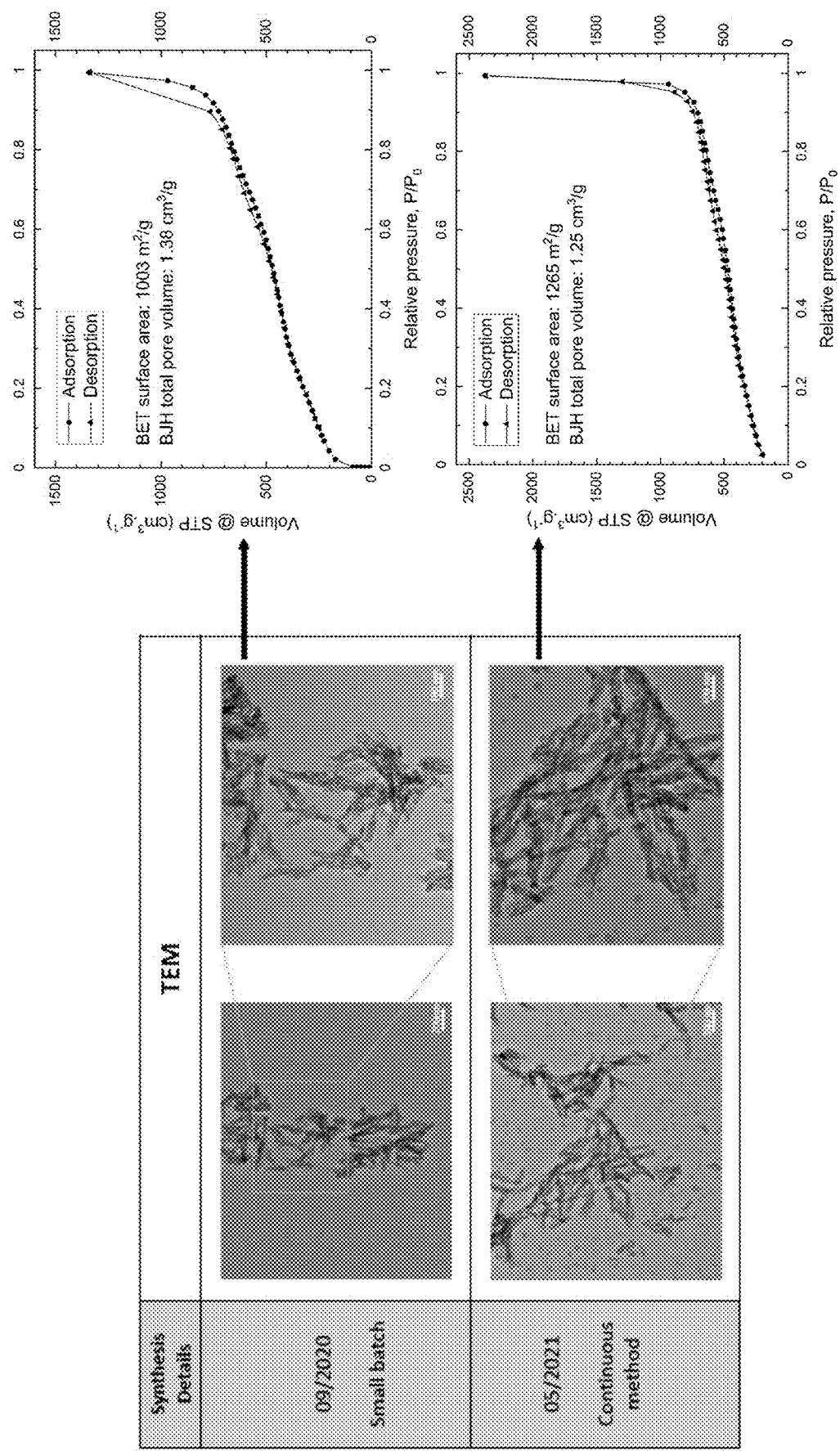

FIG. 11 compares 3D silica network materials formed according to a batch-type process with materials formed according to a continuous-type process.

Figure 12:
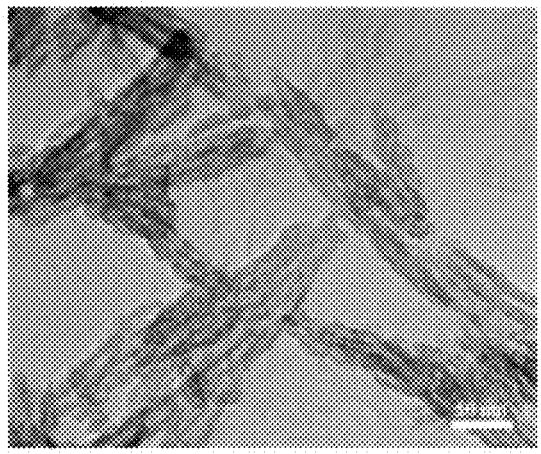
Figure 12:
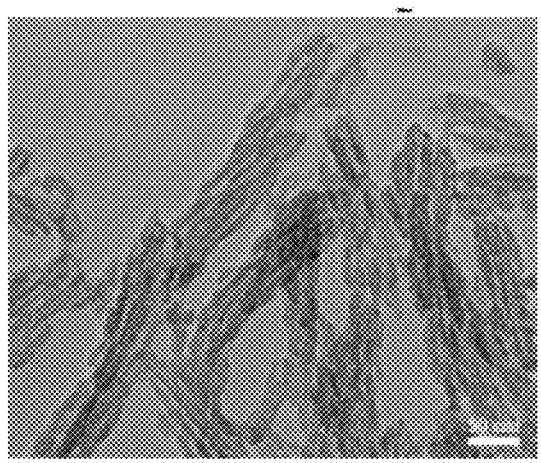

FIG. 12 compares TEM images of a silica 3D network following calcination to remove template materials (top) with a silica 3D network following pyrolysis to form a conformal carbon coating on the network.

Figure 13:
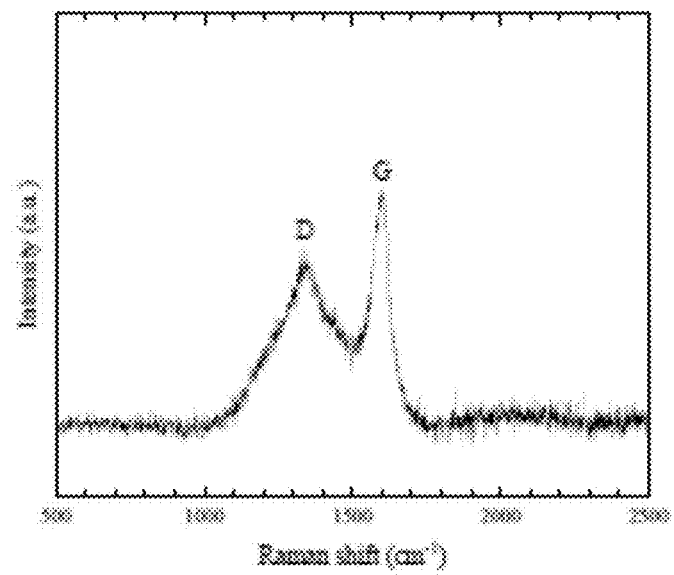
Figure 14:
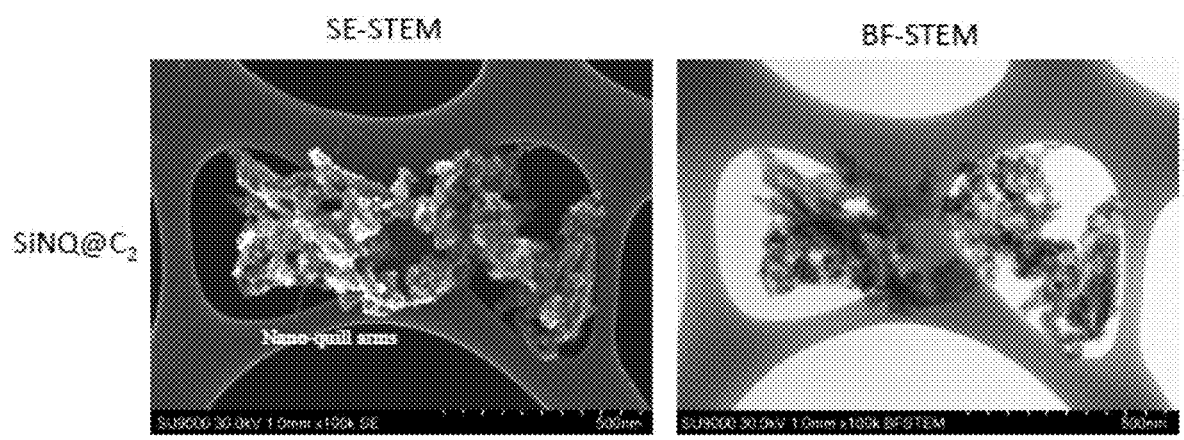

FIG. 13 provides Raman spectra of the silica 3D network of FIG. 14 including a conformal carbon coating.

FIG. 14 provides secondary electron (SE) and bright field (BF) STEM images of 3D networks including a conformal carbon coating following reduction of silica of the network to a silicon-containing material.

Figure 15:
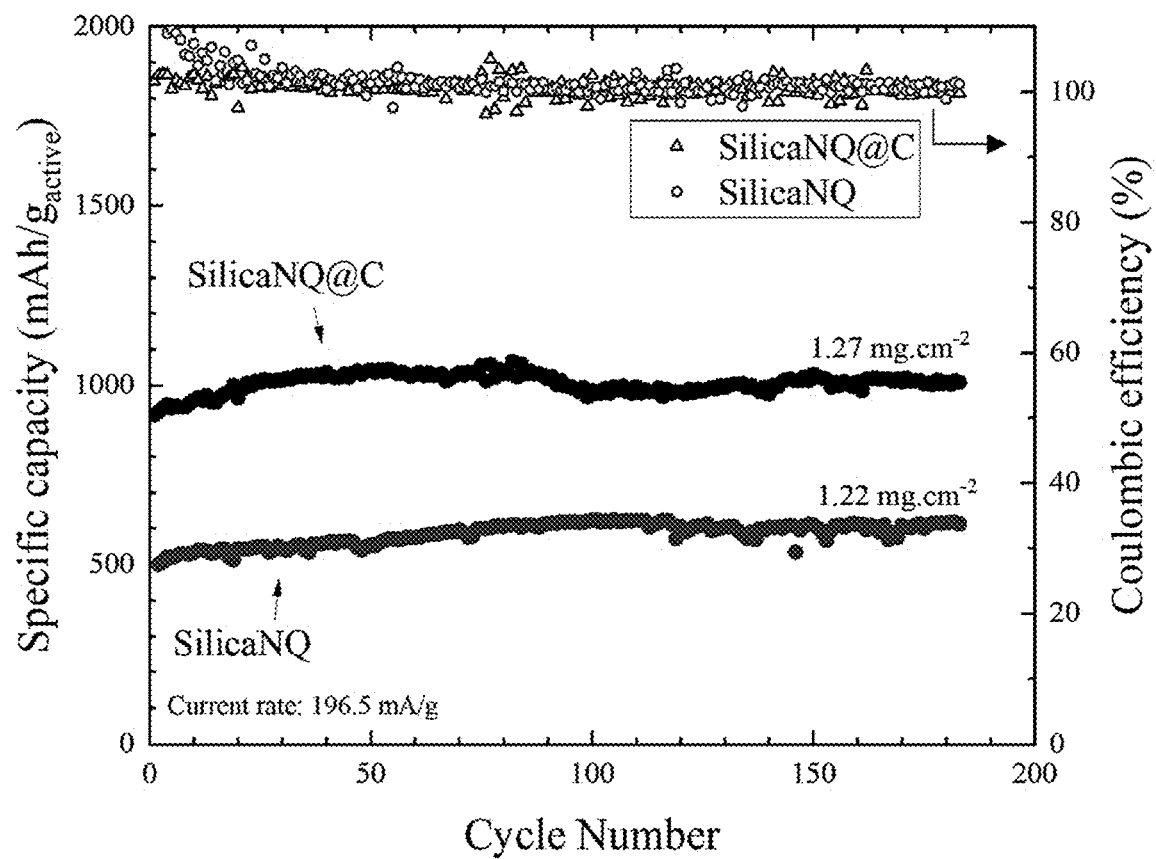

FIG. 15 compares the performance of half cells over approximately 200 cycles, the batteries including anodes including high surface area silica active materials formed according to disclosed methods either with or without a conformal carbon coating.

Figure 16:
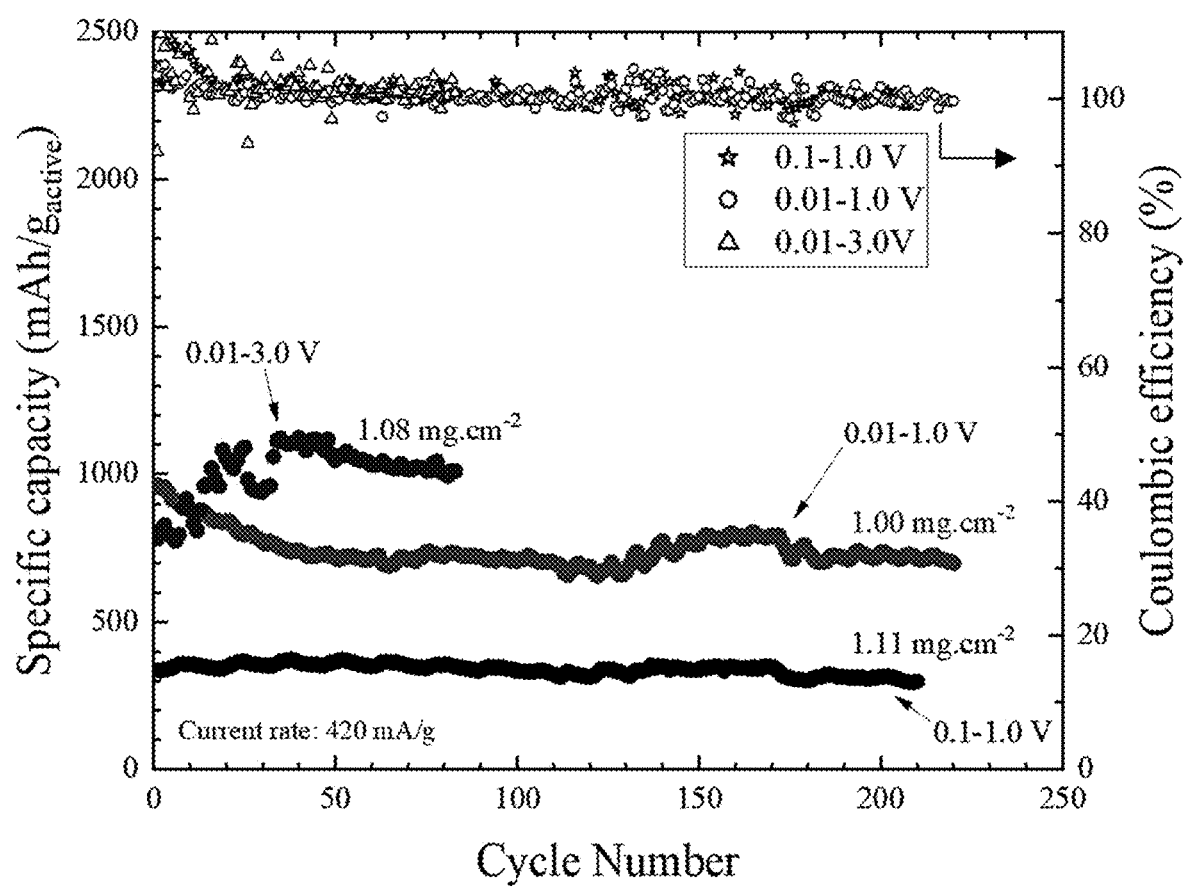

FIG. 16 illustrates the performance of a half cell under various voltage windows, the battery including an anode including porous silicon-based materials formed according to disclosed methods.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

The present disclosure is directed to methods for synthesis of high surface area porous silicon-based materials and silicon-based materials that can be formed according to the methods. Disclosed processes can be scalable and capable of producing large quantities of the high surface area materials with high efficiency due to facile production methods and instrumentation and to wide availability of formation materials. Moreover, the high surface area products can be in the form of a 3D network with multimodal porosity, which can provide advantages that cannot be achieved by nanostructures that are currently available in the form of particles or higher aspect ratio, essentially 1D wires, tubes, or needles. For instance, disclosed high surface area porous material can exhibit repeated volume change with extraction/insertion of lithium ions without destruction and loss of use in a battery application.

Due to such advantages, disclosed methods and products can be useful in a wide variety of applications. By way of example, disclosed methods and materials can be used in energy-related applications including the fabrication of lithium-ion batteries and solar cells. Incorporating disclosed materials in silicon-based anodes for lithium-ion battery technologies can find application in multiple industries including the automotive (electric automobile, truck, train, aircraft) and electrical/electronics (smartphones, computers, tablets) industries. Disclosed methods of formation can provide for decreased anode manufacturing costs. 3D high surface area porous networks as may be formed according to the methods can provide improvements in lithium-ion battery behavior, including highly reversible capacity over numerous charge/discharge cycles, enhanced performance, and cycling stability under a range of operating conditions.

Of course, the high surface area porous silicon-based materials and methods of formation are not limited to battery applications and other useful applications can include, but are not limited to, microelectronics, drug delivery, and agriculture, among others, as would be evident to those in the art.

In general, a formation method can include formation of a reaction composition that includes a template material and a silicate precursor in a liquid medium, e.g., an aqueous medium. Upon reaction of the silicate precursor according to a sol-gel reaction mechanism, a silica gel structure can be formed as a coating on the template network. A method can also include removal or reaction of the template material and optionally, reduction of the silica precursor to form a high surface area porous structure that includes silicon.

Figure 4:
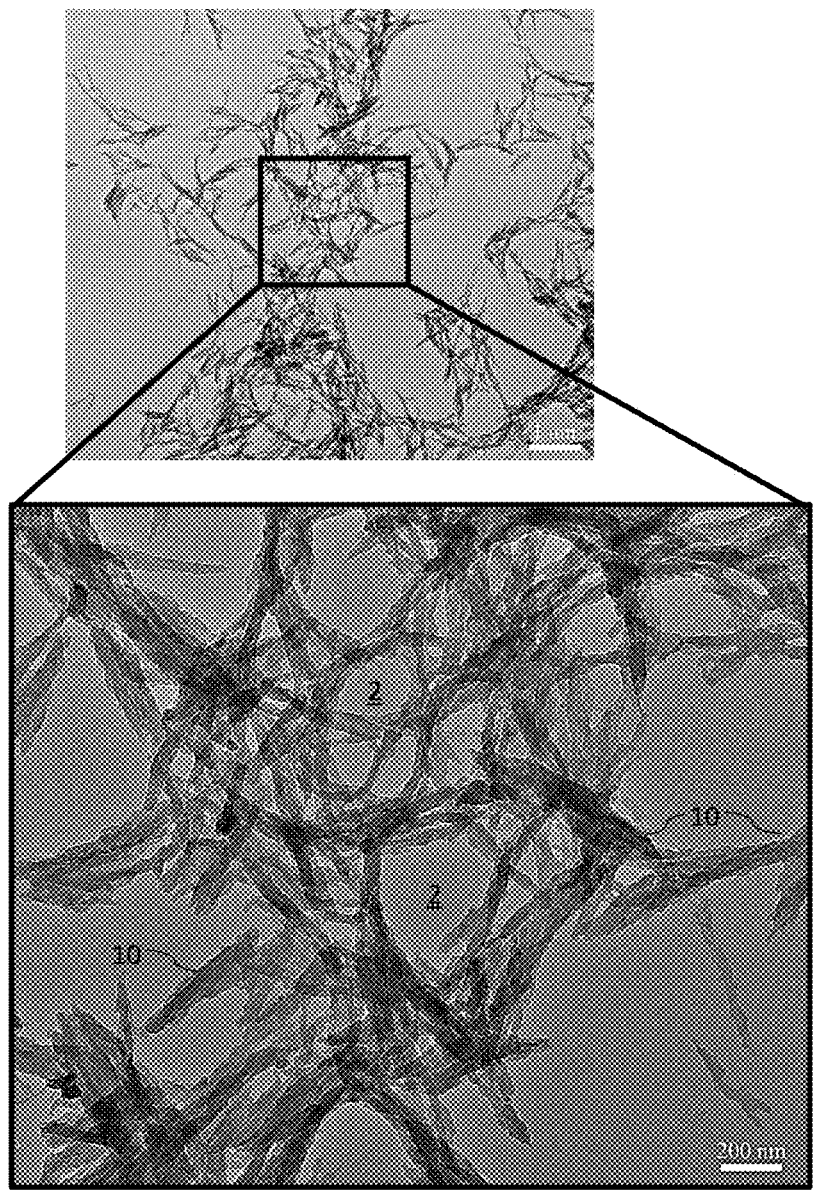
FIG. 4 illustrates an interconnected network including a template material and a silicate coating on the network of template material.
Figure 5:
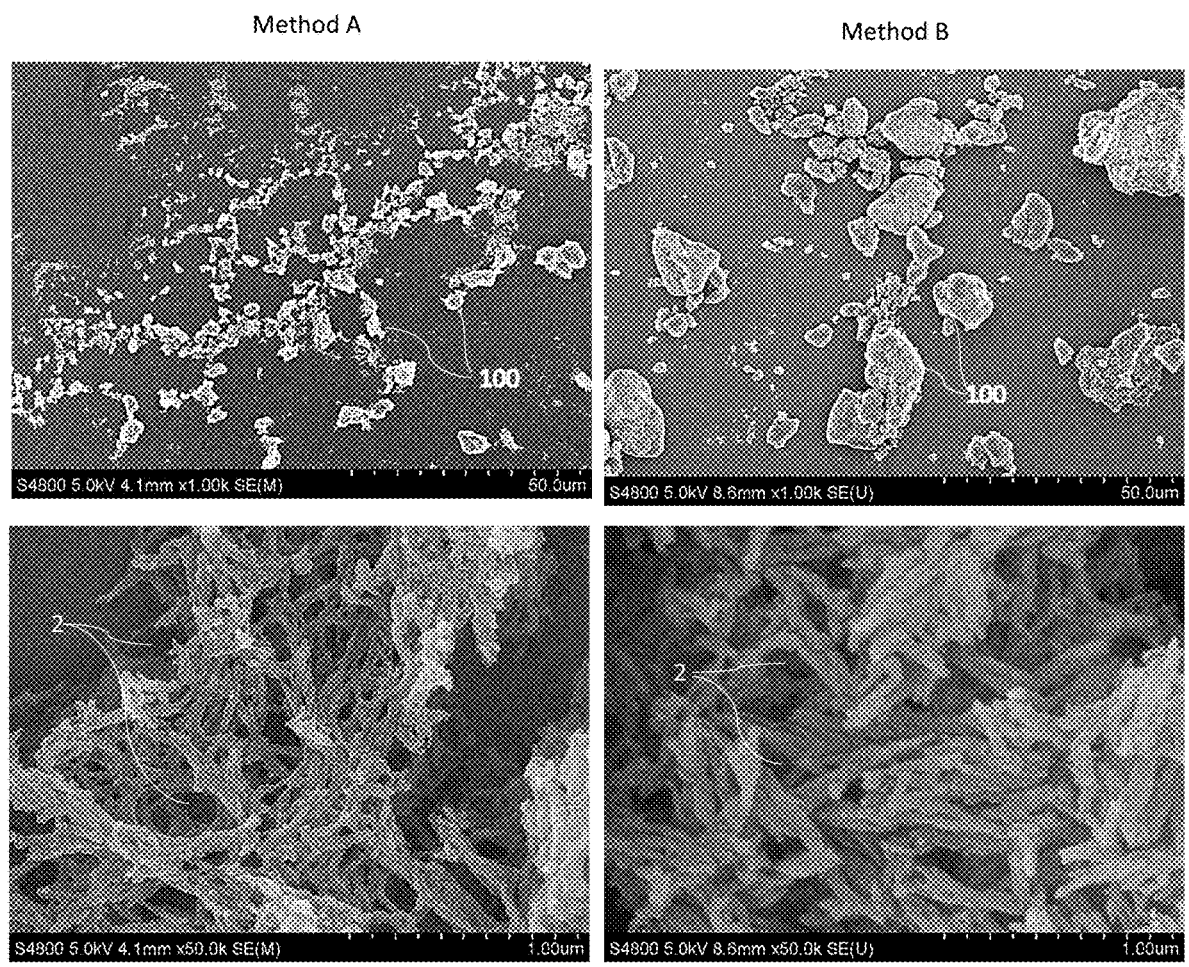
FIG. 5 illustrates 3D silica networks following removal of the template material by two different methods.

FIG. 4-FIG. 9 illustrate high surface area silica structures as may be formed according to disclosed methods and demonstrate the overall structure of the formed materials. As can be seen in FIG. 5, the materials can include a plurality of relatively large aggregates 100 that each include smaller particles, each of which including individual arms or quills 10 (FIG. 6) that can be contiguously interconnected with one another in a single particle of the aggregate 100 or present in the large aggregate 100 in the form of individual arms 10 aggregated with other structures of the aggregate 100 but not necessarily contiguous with or chemically bonded thereto. A 3D network including a plurality of individual arms 10 can exhibit a multimodal porosity. A single aggregate 100 can have an overall size on the order of micrometers, for instance up to about 1000 μm in a cross-sectional dimension, such as from about 5 μm to about 500 μm in a cross-sectional dimension in some embodiments.

Figure 6:
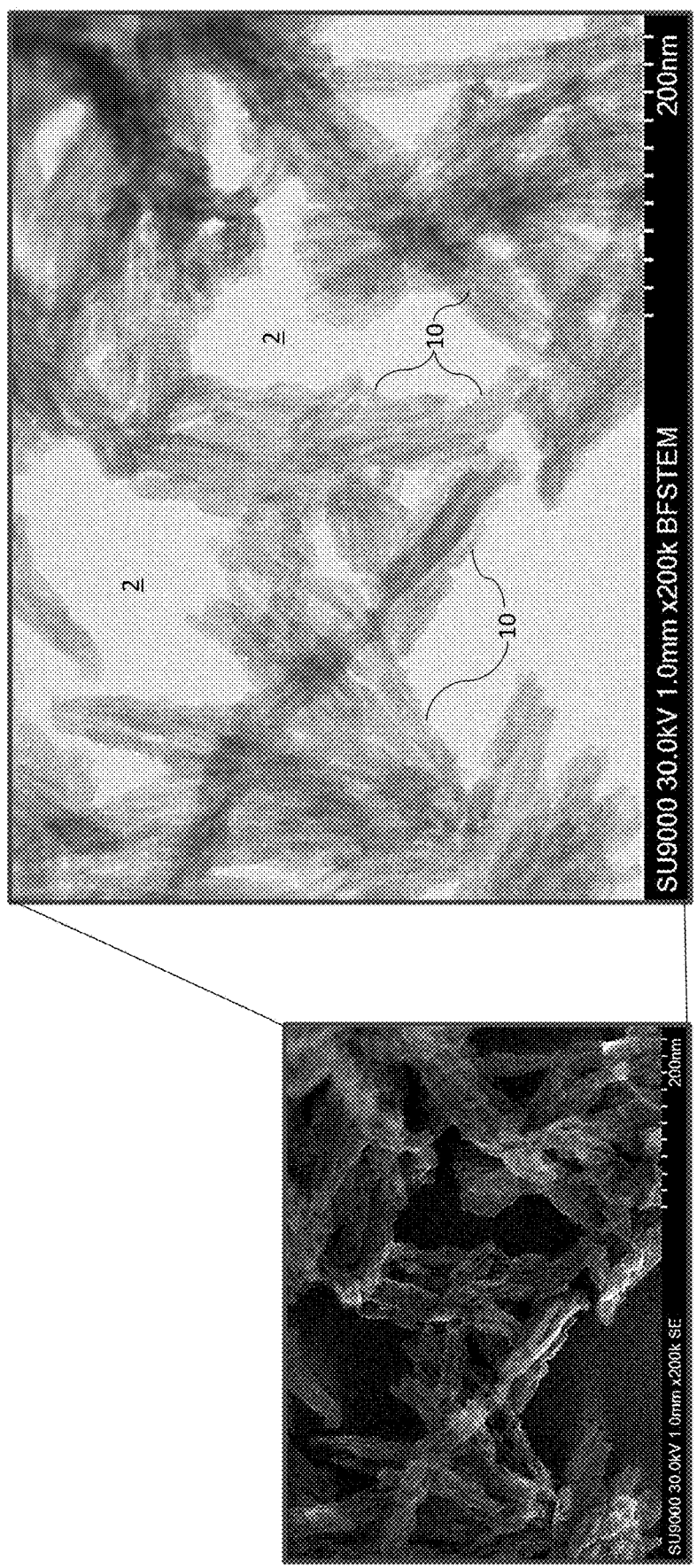
FIG. 6 illustrates a 3D silica network.

With reference to FIG. 4 and FIG. 6 in particular, 3D structures can include a network of interconnected arms 10 formed of a silicon-based material, e.g., silicon and/or silica. Individual arms 10 can be interconnected and contiguous with one another within the larger 3D interconnected network of a single aggregate 100 or can be separable from other arms 10, e.g., a single tubular shaped body that is not contiguous with another arm at either end or along the length of the body but that is aggregated within the interconnected 3D structure. In general, each arm 10 can have a length on a nanometer or a micrometer scale. By way of example, an individual arm 10 can have a length of from about 100 nm to about 10 μm, from about 200 nm to about 5 μm, or from about 500 nm to about 3 μm in some embodiments.

The interconnected arms 10 can together form a 3D structure with pores 2 formed between and among the individual arms 10. As indicated, pores 2 can be on a relatively large scale as compared to porosity of the individual arms 10, e.g., from about 0.5 to about 5 μm in some embodiments. As shown in FIG. 4, this high-level porosity 2 of the 3D interconnected structures can be an open configuration as on the lower left panels of FIG. 5, or a more tightly-packed, closed configuration, as on the lower right panels of FIG. 5, which variation can be controlled by the methods of formation of the structures, as described further herein. In some embodiments, individual arms 10 of an interconnected structure can contact other arms 10 only at a termination of an arm, such that the length of the arm is separate from adjacent arms. Alternatively, arms 10 can be in contact with one another along the axial length, e.g., stacked with one another or intersecting with one another along a length. Moreover, as previously mentioned, a 3D network can include individual arms 10 that are not physically bonded with other arms of a structure in addition to the bonded interconnected arms of a 3D structure.

Figure 7:
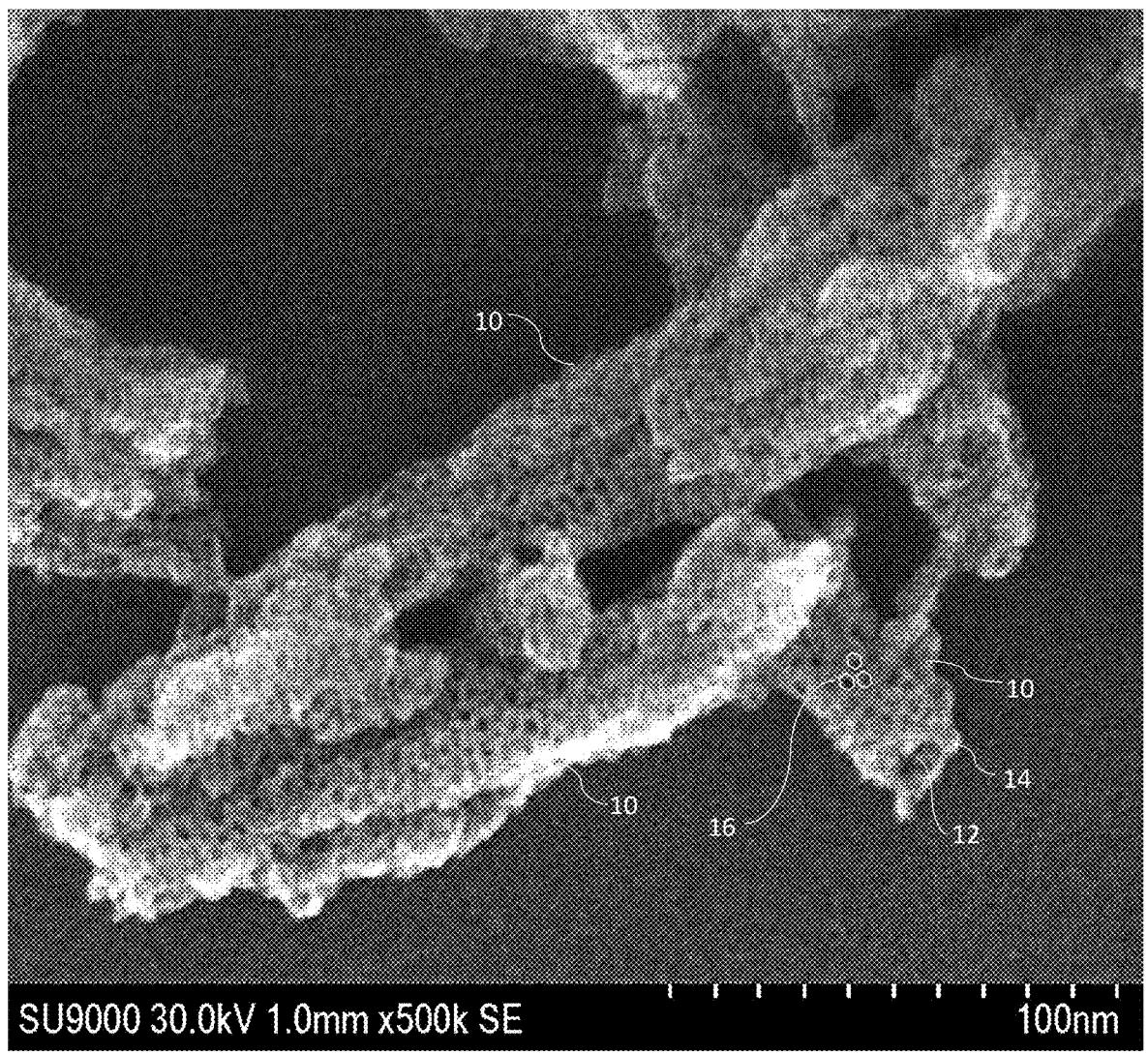
FIG. 7 illustrates individual arms of a 3D silica network, including pores through the walls and the hollow cores of arms of the structure.

As illustrated in FIG. 7, a single arm 10 can include a hollow core 12 surrounded by a wall 14 and pores 16 that pass through the wall 14 from the hollow core 12 to the exterior of the arm 10. A hollow core 12 can generally extend along the entire axial length of a single arm 10 to the termination of the arm 10, at which point the arm 10 can be connected to and contiguous with another arm 10, or can be open to the external environment. In general, a hollow core 12 can have an inner cross-sectional size (e.g., diameter in the case of a circular cross-section) of about 500 nm or less, for instance from about 10 nm to about 200 nm, or from about 50 nm to about 100 nm in some embodiments. A wall 14 surrounding a hollow core 12 can generally have a wall thickness of from about 10 nm or less, such as about 2 nm to about 10 nm, for instance from about 4 nm to about 8 nm.

Individual pores 16 that pass through a wall 14, can generally have a dimension of about 10 nm or less, such as about 1 nm to about 8 nm, or about 2 nm to about 5 nm in some embodiments. The geometry and configuration of the individual pores 16 can also vary, generally depending upon reaction components and conditions. For instance, in the example illustrated in FIG. 7, the pores 16 have a generally hexagonal cross-section. Other shapes can alternatively be formed, however, e.g., round or other polygonal shapes.

As illustrated, a 3D porous structure can exhibit multimodal porosity, including the high level porosity 2 on a relatively large scale between and among individual arms 10 of a structure, as well as the porosity 12 and 16 of the hollow arms. Moreover, the pores 16 passing through the walls 14 of an individual arm 10 can vary in size from one another, which can be controlled through formation methods and materials used, as described further herein, e.g., utilization of multiple porogens and/or catalysts, with different molecular sizes.

Figure 1:
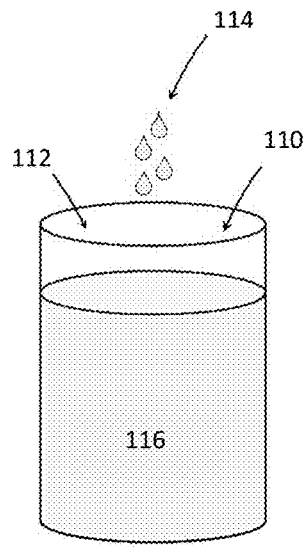
FIG. 1 schematically illustrates a method for forming a 3D silicate gel structure.

FIG. 1 schematically illustrates one embodiment of a formation protocol for forming a high surface area porous silica material as described herein. According to the illustrated method, an essentially 1D template material 110, a surfactant 112, and a silicon-containing precursor 114 can be combined in a reaction medium 116 to form a silicate gel mixture.

The template material 110 can be a material that can be removed or modified during processing without the destruction of a silica coating that is formed on the template. The template material 110 can include natural or synthetic materials having suitable morphology and physical characteristics. Template materials 110 can, for instance, be in the form of 'hard' (e.g., solid, high aspect ratio nanostructures including hollow tubes, solid rods, fibers, needles, etc.) or 'soft' (e.g., liquid, materials such as lyotropic liquid crystal polymers) materials that, in the reaction medium 116, can phase separate to form the high aspect ratio arms of a 3D interconnected template.

In one embodiment, a template material 110 can include a plurality of individual structures formed of a hard (solid) material that, upon dispersal in a reaction medium 116, can aggregate to form a 3D interconnected network. Each individual structure of the template material 110 can have a high aspect ratio (i.e., the ratio of length to cross-sectional dimension). For instance, an individual structure of a template material 110 can have an aspect ratio greater than 1, for instance about 10 or greater, about 50 or greater, or about 100 or greater in some embodiments. By way of example, a template material 110 that is in the form of a plurality of single, separable structures, such as a plurality of nanorods or the like, can include individual structures having a length of about 100 nm or longer, e.g., from about 200 nm to about 1 μm, about 300 nm to about 800 nm, or about 500 nm in some embodiments, and a cross-sectional dimension of about 100 nm or less, for instance about 50 nm or less, or about 10 nm or less, such as about 1 nm or greater, in some embodiments.

Figure 3:
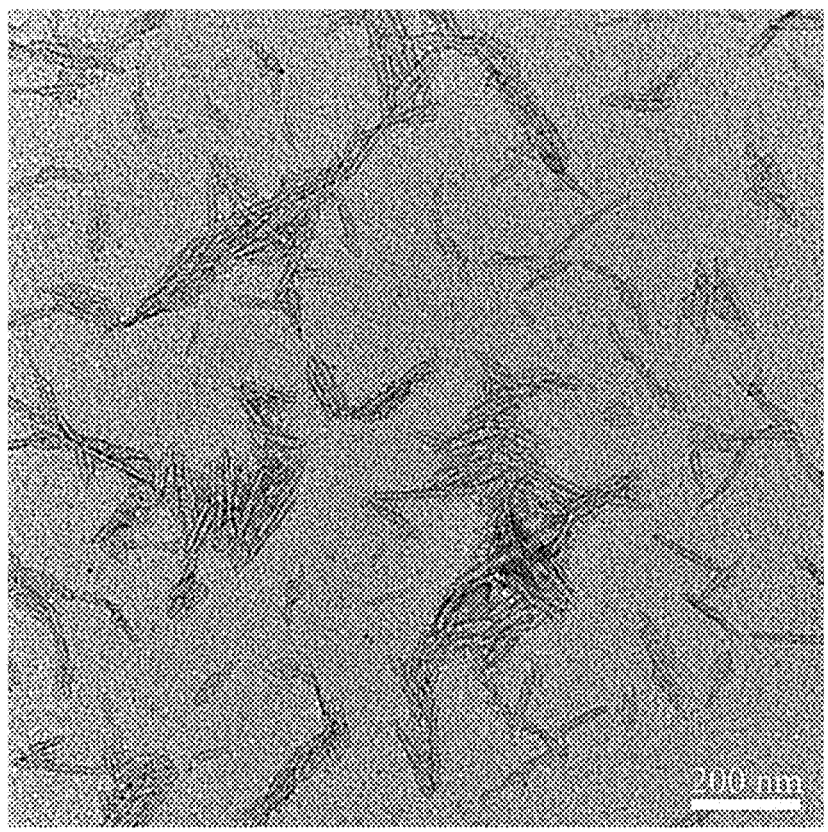
FIG. 3 illustrates a template material.

In one embodiment, cellulose nanocrystals (CNCs), examples of which are illustrated in FIG. 3, can be used as a template material. CNCs can be obtained from retail sources as would be known to one of skill in the art or formed, generally by the acid hydrolysis of native cellulose using an aqueous inorganic acid like sulfuric acid. Upon the completion (or near completion) of acid hydrolysis of the amorphous sections of native cellulose, individual high aspect ratio rod like crystallites (CNCs) are obtained that are dispersible in a reaction medium. CNC possesses excellent mechanical properties, biodegradability, and biocompatibility. CNC generally have a diameter in the range of about 10 to about 20 nm and length of a few hundred nanometers (e.g., about 50 nm to about 500 nm). CNC can also have a high surface area, e.g., about 500 $m^2/g$. Upon dispersal in a reaction medium 116, for instance in conjunction with ultrasonication and/or magnetic stirring methods, CNC can self-assemble to form a chiral or achiral 3D interconnected network (e.g., a nematic) phase that includes a plurality of interconnected arms with a complex architecture. Control of the chirality and other characteristics of the aggregated interconnected network can be brought about through formation processing conditions, for instance, through variation of the pH of the reaction medium.

The template material is not limited to CNC, and alternative hard or soft material can be utilized that can disperse in reaction media 116 to form a 3D interconnected network as a template, e.g., as a chiral or achiral nematic phase.

In one embodiment, a formation method can include the self-assembly of a template material within a reaction medium 116. For instance, upon dispersal in a reaction medium 116, a lyotropic liquid crystal polymer can self-assemble to form a helical assembly of a chiral nematic liquid crystal templating material 110 that can then be used as a soft template for formation of a high surface area 3D porous silica material.

Figure 2:
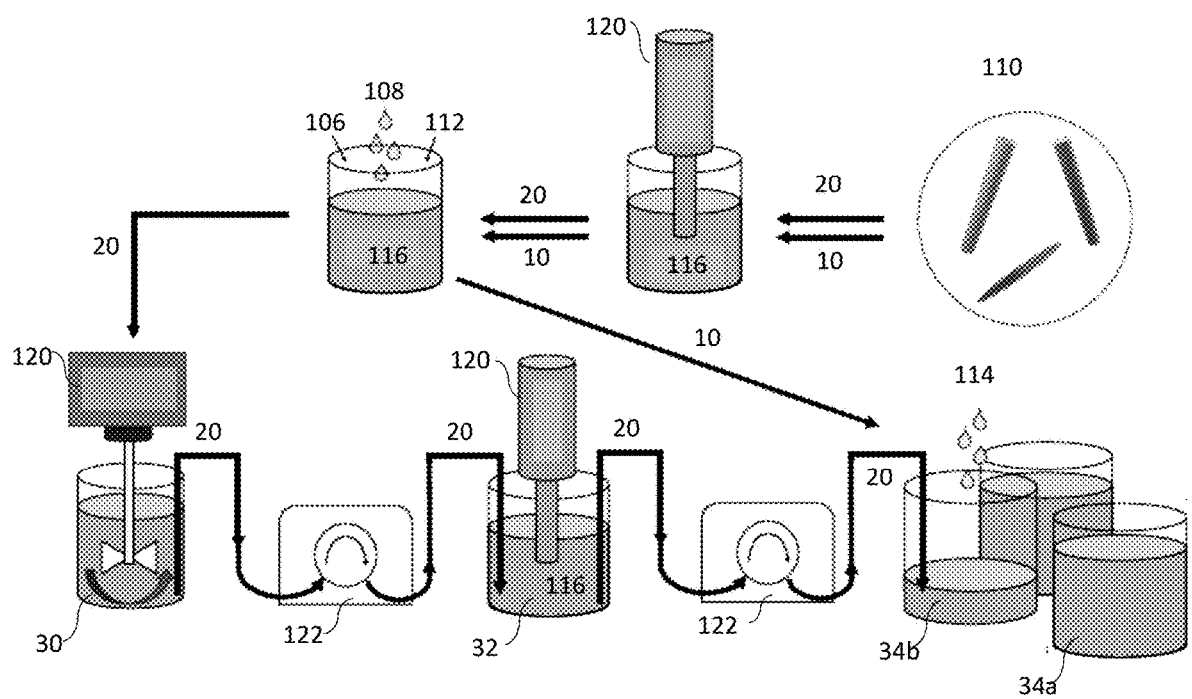
FIG. 2 schematically illustrates batch-type and continuous-type methods for sol-gel process to synthesize 3D silicate gel structures.

In one embodiment, to ensure that the template material 110 is adequately dispersed and forms the desired 3D interconnected network to be used as a template, the reaction medium can be processed, for instance by use of sonication and/or agitation (e.g., magnetic stirring, high shear mixing, etc.). For instance, and as illustrated in FIG. 2, a template material 110 can be added to a reaction medium 116 and, upon agitation by use of an agitation device 120, e.g., a sonicator, shear mixer, etc., the template material 110 can aggregate to form a 3D interconnected template within the reaction medium 116. FIG. 2 illustrates two different possible formation approaches, including a batch-type formation method 10, and a continuous-type formation method 20. As indicated, both approaches 10, 20 can include a step of processing a template material 110 within a reaction medium 116 via an agitation device 120 to form a 3D interconnected template within the reaction medium 116, which generally includes an aqueous solvent, e.g., deionized water that can include catalyst(s) and co-solvent(s).

In one embodiment, a reaction medium 116 can incorporate a templating material 110 in an amount of from about 1 wt. % to about 10 wt. % by weight of the medium, for instance from about 1 wt. % to about 6 wt. %; for instance, in an amount of from about 100 mg to about 500 mg template material per liter water and any co-solvents.

Following formation of a 3D template formed of the template material 110 within the medium 116, additional additives that may be useful in forming the networks may be added to the medium 116. For instance, a surfactant 112, one or more co-solvents 108 and any desired catalysts 106 may be added to the reaction medium 116.

To incorporate the desired porosity in the product materials, a surfactant 112 can be added to the reaction medium 116 in conjunction with the 3D template material 110. Selection of type and concentration of surfactant can be utilized to control the porosity of the final product, including both pore shape, pore size, and pore density, and as such, overall surface area of the final product.

In one embodiment, a surfactant 112 can be added to a reaction medium 116 in a concentration such that it is below the critical micelle concentration (i.e., that concentration at which the surfactant will form micelles in the medium). As such, the surfactant 112 can be added to the reaction medium 116 in the form of free, unaggregated surfactant. In other embodiments, a surfactant 112 can be added to the reaction medium 116 at or above the critical micelle concentration such that, upon addition, the surfactant 112 self-aggregates to form micelles. Variation in chemistry of the reaction medium 116 can be utilized to control the reaction of the silica precursor 114 and hence characteristics of the silicon-based product. For instance, formation of larger, cylindrical micelles in the reaction medium 116 can lead to formation of larger pores in the silicate 3D structure, whereas by formation of cylindrical micelles with smaller diameter, smaller pores can be formed. In one embodiment, multiple different surfactants can be utilized that can form pores of different sizes in the products. In general, however, a surfactant 112 can be included in the reaction medium 116 in an amount of about 5 wt. % or less of the reaction medium, for instance in an amount of from about 1 wt. % to about 5 wt. % in some embodiments.

A surfactant 112 can be cationic, anionic, or nonionic. For instance, in one embodiment, the cationic surfactant cetyltrimethyl ammonium bromide (CTAB) can be utilized. Other cationic surfactants that can be used include, without limitation, alkyammonium salts, gemini surfactants, cetylethylpiperidinium salts, and dialkyldimethylammonium. Anionic surfactants that can be used include, without limitation, sulfates, sulfonates, phosphates, and carboxylic acids. Nonionic surfactants, with the hydrophilic group not charged, include, without limitation, amines (e.g., triethanolamine), poly(oxyethylene oxides), octaethylene glycol monodecyl ether and octaethylene glycol monohexadecyl ether.

In one embodiment, a porogen can be included in a reaction medium 116. Porogens as may be utilized can include other silicon-containing materials that can be combined with a silica precursor 114. By way of example, n-octadecyltrimethoxysilane can be utilized as a porogen. In general, any material that can be removed from pores of the silicate body following formation can be utilized.

A reaction medium 116 can also include a cosolvent 108 as well as one or more other compounds that can be either incorporated into a 3D product or provide use during or following a sol-gel silicate formation reaction. For instance, a cosolvent 108 such as a short chain alcohol (e.g., ethanol) can be incorporated in a reaction medium 116. When included, a cosolvent can generally be incorporated in a reaction medium 116 in an amount of about 5 vol. % or more.

A reaction medium 116 can also include a catalyst 106 that can encourage the hydrolysis and condensation reaction mechanisms during a sol-gel reaction process. In general, a catalyst 106 can be an acidic or basic constituent that can modify the pH of the reaction mixture and catalyze the hydrolysis-condensation. The particular catalyst used and pH of the reaction can be modified as desired as a control mechanism for the final product characteristics. For instant, in an acid medium, a silica gel precursor structure can exhibit porosity that differs in one or more of size, shape, density, etc. from that formed with a base catalyst.

In one embodiment, a base catalyst can include, without limitation, ammonium hydroxide ($NH_4OH$), sodium hydroxide (NaOH), potassium hydroxide (KOH), lithium hydroxide (LiOH), calcium hydroxide (CaOH), or any combination thereof. The base catalyst may be present in a concentration of between about 0.01 M and about 1 M. For example, the base catalyst may be present in a concentration of about 0.05 M. The pH of a base-catalyzed reaction mechanism can generally be from about 7 to about 12.

When considering an acid-catalyzed hydrolysis condensation reaction, a suitable acid catalyst can be used, such as hydrochloric acid (HCl) or the like, and the reaction can be carried out at a pH in a range from about 2 up to 7, for instance from about 3 to about 5.

Referring again to FIG. 1 and FIG. 2, a silica precursor 114 is also incorporated in the reaction medium 116 in conjunction with one or more surfactants 112, cosolvents 108, catalysts 106, etc. that can then be further processed according to a sol-gel reaction to form a silicate coating on the surface of the 3D template.

As indicated in FIG. 2, in a single, batch-type formation process 10, a silica precursor 114 can be added to the reaction medium 116 upon addition of the other components of the reaction medium 116 and a sol-gel reaction can then be carried out to form a 3D silicate network that includes a silicate layer on the 3D template material 110.

In a continuous process 20, the reaction medium 116 can be moved via one or more pumps 122 through a series of tanks 30, 33, 34, with each tank being processed using an agitation device 120, as indicated, prior to pumping to the following tank.

As shown in FIG. 2, in one representative embodiment of a continuous process 20, upon addition of one or more surfactants 112, cosolvents 108, and/or catalysts 106, a reaction medium 116 can be agitated 120, e.g., by use of a high shear mixer, in an initial tank 30 and then moved via a pump 122 to a second tank 32, wherein it can be agitated 120, e.g., by use of a sonicator, prior to final move via a pump 122 to a final tank 34 into which the silica precursor 114 can be added. A continuous process 20 can be preferred in some embodiments, for instance, in a scaled-up process in which large quantities of the 3D materials are to be formed. For instance, upon filling of a final tank 34a with the agitated reaction medium 116, the silica precursor 114 can be added, and the contents of that tank 34a can be processed according to a sol-gel reaction to form a 3D silicate network on the template retained therein while another tank 34b can be filled with the agitated reaction medium 116. According to a continuous process 20, large quantities of a 3D silicate material can be formed relatively quickly, for instance, gram quantities of a 3D silicate material can be formed in a manner of minutes.

A silica precursor 114 can include any of a broad range of silica and organosilica precursors, e.g., those of the general type $Si(OR)_4$, $Si(OR)_3R'$, $Si(OR)_2R'_2$, $Si(OR)R'_3$, and mixtures thereof. R and R' may be the same or different from one another, examples of which can include, without limitation, a phenyl group ($C_6H_5$), a substituted phenyl group, an alkyl group, a branched alkyl group, a cycloalkane, or any similar organic component. Bridged silica precursor compounds are also encompassed, for instance, bridged compounds of the general structure $(R'O)_3Si-R-Si(OR')_3$. Examples include, without limitation, $R=CH_2$, $R=C_6H_4$ (phenyl) and R=alkyl (e.g., ethylene, propylene, etc.) and R' is an organic group, such as a linear or branched alkyl or another organic such as an unsaturated hydrocarbon or a benzyl group.

Examples of silica precursors can include, without limitation, tetraethylorthosilicate (TEOS), tetramethylorthosilicate (TMOS), or bis(triethoxysilyl)methane.

In general, a silica precursor 114 can be incorporated in a reaction medium 116 in an amount of from about 1 milliliter to about 10 milliliters silica precursor per liter of the solvent component of the reaction medium 116, e.g., water and any co-solvents, for instance from about 4 mL/L to about 8 mL/L in some embodiments.

Over the course of a sol-gel hydrolysis and condensation reaction, a layer of silicate can develop on the surface of the 3D template retained in the reaction medium 116, resulting in the formation of a high surface area 3D porous silicate network, examples of which are illustrated in FIG. 4-FIG. 9. The thickness of the resulting silicate layer can be varied through modification of type and amounts of components included in the reaction medium 116 as well as through variation in the reaction time. For instance, a sol-gel reaction can proceed for a period of time of several hours, for instance, up to about 24 hours, or from about 0.5 to about 5 hours in some embodiments.

Following the formation of a silicate structure on the 3D template, the 3D structure and underlying template can be removed from the reaction medium 116 and separated from components of the reaction mixture 116, e.g., dried, prior to desired post-processing to remove/modify the template materials.

Preferred post-processing techniques can vary depending upon the final application desired for the 3D silicon-based materials. In general, removal of reaction mixture materials can include filtering and/or drying, which can remove water and other formation materials (e.g., co-solvents, surfactants, catalysts, etc.) from the silicate structure. Filtering can be carried out via vacuum filtering, centrifugal filtering, gravity filtering, combinations thereof, or any other suitable filtering process. Likewise, drying can be carried out according to freeze drying, thermal drying, ambient drying, etc., or combinations thereof.

In some embodiments, a formation process can include removal of the template material upon which the silicate layer has been deposited. A removal process can vary depending upon the nature of the materials to be removed. For instance, in those embodiments in which a hard template material 110 is utilized, template materials can be removed by means of heating and/or chemical treatment. In other embodiments, for instance in those embodiments in which the template material is a soft material such as a liquid crystal polymer, the template materials can be removed by an acid washing method or a solvent extraction approach.

By way of example, in one embodiment, a reaction medium 116 including the formed 3D structure of a silicate layer on a template can be filtered and dried, e.g., by freeze drying, heating, or simply dried in ambient conditions, to remove components of the reaction mixture 116. Following, the 3D structure can be subjected to a calcination process in air, which can remove the template as well as any other remaining formation materials from the 3D silica network. For instance, following drying, calcination can be carried out in air at a temperature of from about 500° C. to about 700° C., or about 600° C. in some embodiments, for a period of several hours, e.g., about 8 hours.

In one embodiment, template materials can be removed from a silica 3D network by use of a chemical treatment process In any case, following removal of the template materials 110 and any other components remaining from the reaction medium 116, the resulting structure can include a 3D interconnected silica network that includes a plurality of hollow quills, each of which surrounded by a porous wall, as illustrated and discussed above.

In one embodiment, following removal of the template material 110, the 3D interconnected network can be further processed to include a coating layer. Silicon nanoparticles as are commonly utilized in anodes have been found to exhibit improved performance by addition of a static interface between the nanoparticles and the electrolyte of the cell. Such a static interface can be formed by addition of a carbon coating on the nanoparticles. Thus, in some embodiments, a 3D interconnected network can be further processed following removal of the template to form a carbon coating on the network. Formation methods for a carbon coating can include, without limitation, chemical vapor deposition (CVD), biomass decomposition, growth of carbon nanostructures on the surface of silicon-containing nanoparticles, etc. By way of example, a precursor, e.g., a resin, polymer, fossil fuel, biomass, etc., can be carbonized via pyrolysis and deposited on the surface of the 3D structures. In one embodiment, a CVD process can be utilized in which a suitable vapor-phase precursor, e.g., acetylene, can be heated to a dissociation temperature in the presence of the 3D structure to encourage deposition of carbon of the dissociated acetylene precursor on the surface of the 3D structure. In another embodiment, a CVD process can be utilized to grow individual carbon structures, e.g., carbon nanotubes, on the surface of the 3D structure.

In some embodiments, rather than removing the template of the 3D silica structure, the structure can be further processed to modify the template materials 110 and to utilize the resulting materials to form a coating on the 3D silica network. According to one such embodiment, the template material 110 can function as a precursor in a conformal carbon coating process. By way of example, following filtering and/or drying, a silicate 3D network including a layer of silicate on an underlying template can be subjected to thermal treatment under an inert atmosphere, which can pyrolyze the template material 110 and encourage formation of a conformal carbon coating over the surface of the 3D network. Pyrolysis can be carried out in an inert atmosphere, e.g., argon, at a temperature of from about 500° C. to about 700° C., or about 600° C. in some embodiments, for a period of several hours, e.g., about 4 hours to about 8 hours, or about 6 hours in some embodiments, which can pyrolyze the template material and provide a conformal carbon coating over the surface of the 3D network. This approach for forming a conformal carbon coating on a 3D silica network can be preferred in some embodiments, as it can more completely coat all surfaces of the 3D network including both internal and external surfaces of the hollow arms 10 and the smaller pores 16.

Whether formed in a batch or continuous-type formation process, and whether formed with removal of the template materials with optional further coating or formed with modification of the template materials and thereby forming a conformal coating on the 3D network, a 3D network formed according to disclosed methods can exhibit a very high surface area and pore volume. By way of example, a porous 3D silica network formed according to disclosed methods can exhibit a BET surface area of about 900 $m^2/g$ or greater, or about 1,000 $m^2/g$ or greater, such as from about 1,000 $m^2/g$ to about 1,500 $m^2/b$ in some embodiments. A 3D silica network can also exhibit a high BJH total pore volume, such as about 1 $cm^3/g$ or greater, such as from about 1 $cm^3/g$ to about 2 $cm^3/g$ in some embodiments.

In some embodiments, a formation process can include conversion of a 3D network of silica to form a silicon-containing material. In one embodiment, a conversion process can include a thermal reduction approach. A thermal reduction process can include heating the silica 3D network in the presence of a suitable reducing agent, including, without limitation, magnesium (Mg), aluminum (Al), sodium (Na), carbon (C) or other suitable strong reducing agents in an inert atmosphere. According to one embodiment, a silica 3D network can be combined with a reducing agent (e.g., Mg) at a Mg:silica molar ratio of from about 1:1 to about 5:1 and heated at temperature of from about 450° C. to about 900° C. in a sealed reactor to produce a product that includes silicon, for instance in a concentration of about 30 wt. % or greater. In some embodiments, a reduction process can be a partial reduction process and can be controlled so as to reduce only a pre-determined amount of the silica of the 3D network to silicon. A resulting porous 3D structure can include silicon optionally with remaining silicon oxides, e.g., amorphous and/or crystalline Si, $SiO_x$, and $SiO_2$, or a mixture thereof in any combination.

The porous silicon-based materials can be used in a variety of applications. In one particular embodiment, the porous materials can be utilized as an active material in an anode in lithium-ion batteries for high capacity and good cycling stability. For instance, particles including the porous silicon-based materials can be mixed with a binder and any other optional electrically conductive powders, followed by coating, drying, calendaring, etc. as is generally known in the art to form an anode of an electrochemical cell. The organic binder can include, but is not limited to, sodium carboxy methyl cellulose (CMC), polyvinylidine fluoride (PVDF), polyacrylic acid (PAA), polyacrylonitrile (PAN), polyimide, polyethylene oxide, polyethylene, polypropylene, polytetrafluoroethylene, polyacrylates, rubbers, e.g., ethylene-propylene-diene monomer (EPDM) rubber or styrene butadiene rubber (SBR), copolymers thereof, or mixtures thereof. Other materials as may be incorporated in an anode can include one or more additional lithium intercalation or alloying compounds such as, without limitation, graphite, synthetic graphite, coke, fullerenes or other graphitic carbons, and the like.

In one embodiment, 3D networks as described can be mixed with a binder and any other components and placed in electrical communication with a current collector. The current collector can comprise metal, such as a metal foil or a metal grid. In some embodiments, the current collector can be formed from nickel, aluminum, stainless steel, copper or the like. The electrode material including silicon materials as described and a binder can be cast as a thin film onto the current collector. The electrode material with the current collector can then be dried, for example in an oven, to remove solvent from the electrode. In some embodiments, the dried electrode material in contact with the current collector foil or other structure can be subjected to a pressure, such as, from about 2 $kg/cm^2$ to about 10 $kg/cm^2$.

High surface area silicon-based materials can also be used in solar cells for improved light absorption and in light-emitting devices. The hollow structure and high porosity of the silicon-based materials can provide use in carrying and delivery agents (e.g., drugs or other pharmaceuticals) in disease therapy, biomedicine, and other drug delivery applications. In addition, disclosed materials can be employed as carrying agents for a variety of fertilizers, pesticides, and herbicides to improve crops for sustainable agriculture. Disclosed materials can be utilized in applications such as water treatment, air purification, paint industry, oil and gas, agriculture, bioimaging and bioengineering, energy storage, etc.

The present disclosure may be better understood with reference to the Examples set forth below.

Example 1

A sol-gel reaction mixture was formed including TEOS silica precursor and CNC as template (FIG. 3). CTAB was utilized as surfactant with ethanol (EtOH) added as a co-solvent. The hydrolysis and condensation reactions were catalyzed with an ammonium hydroxide ($NH_4OH$) catalyst.

A variety of different parameters were examined as shown in Table 1, below.

TABLE 1

| Component | Values |
| --- | --- |
| Ethanol (vol. %) | 0, 5, 10, 20, 30, 40 |
| CTAB (mg/L ($H_2O$ + EtOH)) | 0, 100, 200, 400 |
| $NH_4OH$ (mL/L ($H_2O$ + EtOH)) | 2, 4, 8, 16, 32 |
| Reaction time (hours) | 0.5, 1, 2, 4 |

A representative reaction mixture included 20 vol. % EtOH; 4 mL/L ($H_2O$+EtOH) $NH_4OH$; 200 mg/L ($H_2O$+

EtOH) CNC; 200 mg/L (H$_2$O+EtOH) CTAB; 5.6 mL/L (H$_2$O+EtOH) TEOS; and a reaction time of 2 hours. FIG. 4-FIG. 7 illustrate representative examples of the silica materials formed. Electron microscopy images of the products (FIG. 7) showed that the thru-wall pores had a hexagonal cross-section with a cross-sectional dimension of from about 2 nm to about 4 nm.

To remove the CNC template, two different approaches were examined. In a first approach (Method A on FIG. 5), the materials were freeze-dried followed by calcining in air. In a second approach (Method B on FIG. 5), the materials were oven-dried followed by calcining in air. Freeze drying was performed overnight. Oven drying was performed at 105° C. for 24 hours. Air calcination was performed at 600° C. for 8 hours with a slow heating (heating ramp of 1-5° C./min). As shown, the Method A samples exhibited a more open structure as compared to the denser Method B samples.

Figure 8:
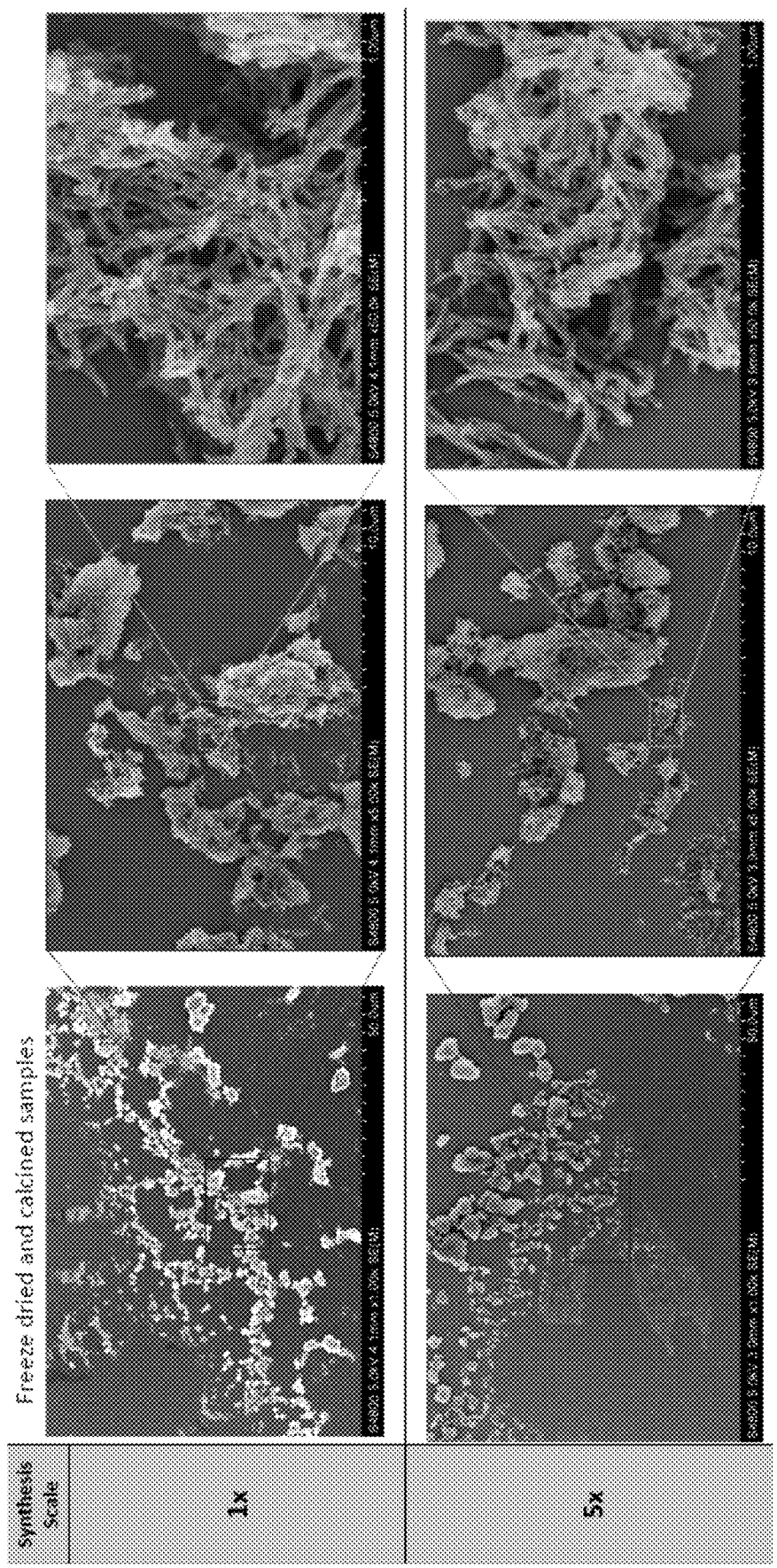
FIG. 8 compares two different samples of a 3D silica network formed at two different synthesis scales.
Figure 9:
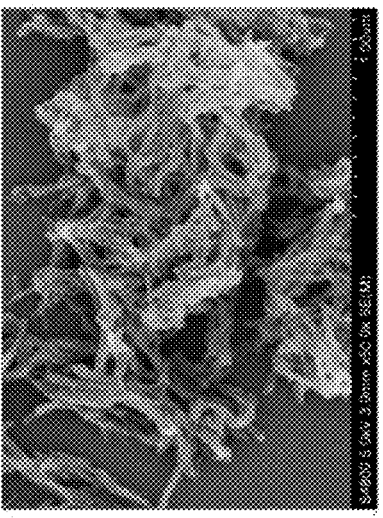
FIG. 9 compares two different samples of a 3D silica network formed utilizing the same approach at different times to confirm the repeatability of the silica forming technique.

FIG. 8 illustrates the materials formed according to the freeze drying/calcining method and includes samples formed in a 200 mL total volume reaction mixture and a 5× larger scale 1 L reaction mixture. FIG. 9 illustrates samples formed according to the freeze drying/calcining method at two different times to verify the repeatability of the silica formation process. As shown, the methods produced consistent products with scale-up over multiple formations.

Figure 10A:
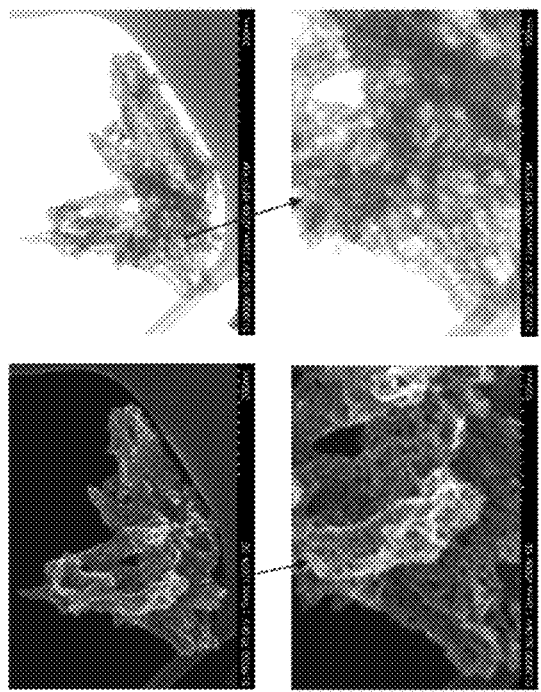
FIG. 10A presents scanning transmission electron microscopy (STEM) images of 3D networks following reduction of silica of the network to a silicon-containing material.
Figure 10B:
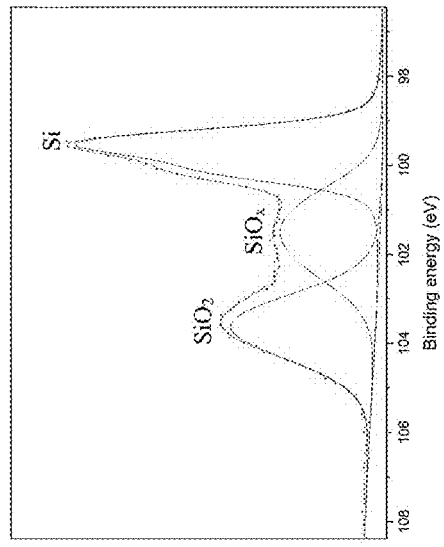
FIG. 10B presents the x-ray photoelectron spectroscopy (XPS) results of the materials of 3D networks of FIG. 10A following reduction of silica of the network to a silicon-containing material.
Figure 10C:
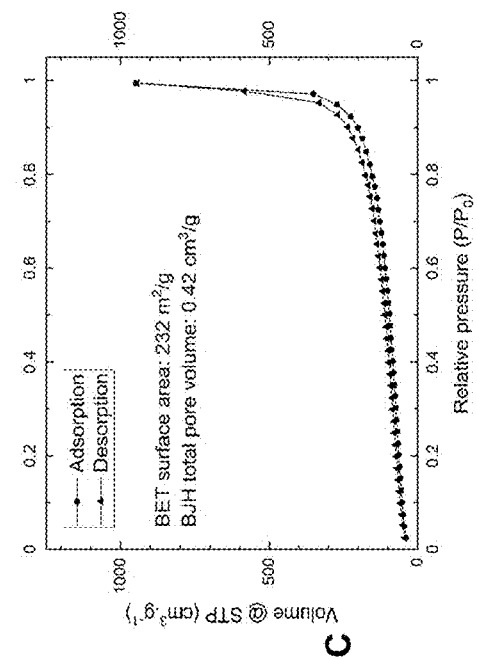
FIG. 10C presents the BET surface area results of the materials of 3D networks following reduction of silica of the network to a silicon-containing material.
Figure 10D:
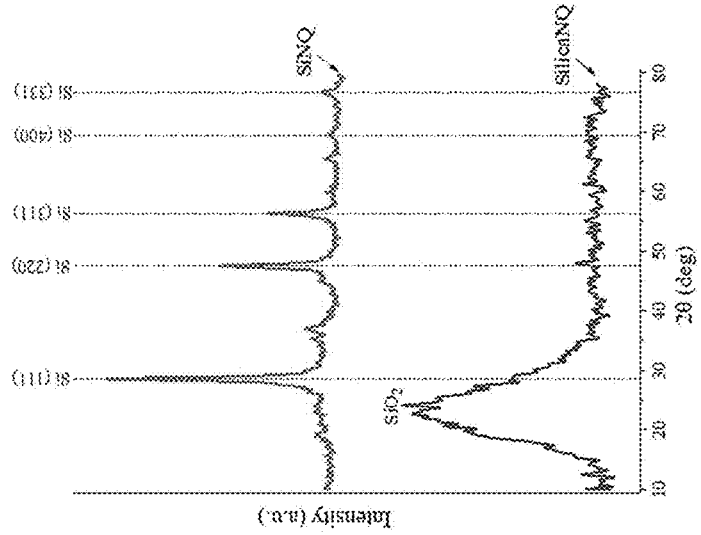

The silica materials were reduced according to a magnesiothermal reduction process that included mixing Mg:silica with molar ratio of 2:1. Different heating cycles were examined. These included:
a) reduction at 650° C. for 6 hours
b) reduction at 850° C. for 6 hours
c) reduction at 650° C. for 6 hours, then cooling down to room temperature, followed by reduction at 850° C. for 6 hours
d) reduction at 650° C. for 2 hours, followed by ramping to 850° C. and reduction at this temperature for 1 hour Following reduction and purification processes, a 3D silicon-containing material called silicon nano-quill (SiNQ) is achieved. Structural characteristics of representative silicon-based 3D networks following reduction (according to path (a)) are provided in FIG. 10A-FIG. 10D. As illustrated in FIG. 10A, the SiNQ structures retained the porosity upon reduction. The BET analysis indicates a high specific surface area of >200 m$^2$/g and a total pore volume of >0.4 cm$^3$/g in the reduced structure. The XPS analysis (FIG. 10B) shows the presence of 3 components in the materials, including elemental Si, SiO$_x$, and SiO$_2$.

Example 2

3D silica networks were formed according to a batch process and a continuous process as illustrated in FIG. 2. The formation materials included CNC template materials using a reaction mixture as described in Example 1. Upon addition of the CNC template materials, the mixture was sonicated for 5 minutes at 30% amplitude prior to addition of surfactant, co-solvent, and catalyst. In the continuous process, this mixture was subjected to shear mixing, pumped to another container, and subjected to additional sonication prior to being pumped to a final container to which the silica precursor was added.

Following freeze drying and calcination in air at 600° C. for 8 hours, the resulting products were compared for differences in surface areas and pore volumes. Results are provided in FIG. 11. As can be seen, the products formed via the continuous process with additional stirring and sonication exhibited a higher BET surface area.

Example 3

3D silicate networks were formed as described above in Example 1. However, rather than removing the template materials via calcination, the structures including the silicate 3D network on a CNC template were pyrolyzed at 600° C. for 6 hours under argon to produce a 3D silica network including a conformal carbon coating thereon. FIG. 12 compares silica 3D network formed according to the same process except for being calcined in air at the same conditions (top) with the pyrolyzed product (bottom). FIG. 13 provides Raman spectra of the 3D network subjected to pyrolysis. The Raman spectra and STEM-EDS mapping (not shown) confirmed the presence of carbon in the pyrolyzed materials.

The silica networks including the conformal carbon coating were then reduced according to a magnesiothermal reduction process. The Mg:silica molar ratio was 2:1, and the megnesiothermic reduction was conducted at 650° C. for 6 hours. FIG. 14 provides a SE-STEM (left) and a BF-STEM image (right) of the material produced from the above reduction process. The images confirmed that the porosity of the materials remained intact. STEM-EDS mapping (not shown) confirmed the presence of carbon following the reduction.

Example 4

Coin-type half cells were prepared using an anode that included reduced silicon-based materials as described in Example 1 and Li metal as the counter electrode. Anodes were fabricated by coating a slurry of the 3D silicon-based materials on commercial Buckypaper (BP). The slurry contained 60 wt. % silicon-based materials, 20 wt. % polyvinylidene fluoride (PVDF) binder, and 20 wt. % carbon black (Super Pe). The mass loading of Si-based active material in all anodes were >1.0 mg/cm$^2$. Using a battery tester, half cells underwent cycling (i.e., charging and discharging) under various current rates, in mA/g unit. Cycling was performed in the voltage range of 1.0-0.01 V, 1.0-0.1 V, or 3.0-0.01 V. Analysis provided the discharge capacity of the electrodes (specific capacity, mAh/g$_{active}$, based on the mass of anode active material) for each cycle. For silica and carbon-coated silica active materials, the current rate was determined based on the theoretical gravimetric capacity of SiO$_2$ (i.e., 1965 mAh/g). For reduced Si-containing active materials, the current rate was determined based on the theoretical gravimetric capacity of crystalline Si (i.e., 4200 mAh/g).

FIG. 15 illustrates the results including Coulombic efficiency (open symbols, right axis) and the specific capacity (solid symbold, left axis). As indicated, the anode prepared using the silica materials with no reduction to silicon (designated by SilicaNQ) carried out provided a stable capacity of about 600 mAh/g up to 180 cycles and by forming a conformal carbon coating on the silica materials (designated by SilicaNQ@c), the capacity of the anode was improved to about 1000 mAh/g.

FIG. 16 provides the cycling performance and related Coulombic efficiency of a battery including an anode with the reduced silica materials (i.e., SiNQ) tested at different voltage windows. The half cells underwent cycling under a current rate of 420 mA/g in voltage ranges as indicated. As indicated, the materials provided excellent cycling performance for over 200 cycles. By testing in the voltage window of 0.01 V to 3V, the capacity of the anode is shown to increase to about 1100 mAh/g.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming a three-dimensional silicon-containing network comprising:
dispersing a cellulose nanocrystal template material in a reaction medium comprising water, such that the template material aggregates upon the dispersal to form a three-dimensional template within the reaction medium;
combining a tetraethyl orthosilicate silicon precursor, a cetyltrimethyl ammonium bromide surfactant, ethanol as a co-solvent, and a ammonium hydroxide catalyst in the reaction medium with the template, the reaction medium including the ethanol in an amount of 20 vol % of the reaction medium, and including the catalyst in a concentration of from 4 ml/L to 32 ml/L of the ethanol and the water of the reaction medium combined, wherein upon the combination the silicon precursor undergoes a sol-gel reaction and forms a silicon-containing gel on the three-dimensional template;
freeze drying the silicon-containing gel to form a silicon-containing layer on the three-dimensional template;
calcining or pyrolyzing the freeze-dried silicon-containing layer on the three-dimensional template and thereby removing or modifying the template; and
thermally reducing the silicon-containing layer to form the three-dimensional silicon-containing network, the network comprising a plurality of hollow nano-quills, each hollow nano-quill comprising silicon oxides and being defined by a hollow core surrounded by a porous wall, the three-dimensional network exhibiting multimodal porosity, wherein the multimodal porosity comprising large pores of 0.5 µm to 5 µm formed by interconnected arms of the nano-quills, and pores of the porous wall surrounding the hollow core having a dimension of 1 nm to 10 nm.

2. The method of claim 1, wherein the freeze-dried silicon-containing layer on the three-dimensional template is calcined in air.

3. The method of claim 1, wherein the freeze-dried silicon-containing layer on the three-dimensional template is pyrolyzed under an inert atmosphere.

4. The method of claim 1, wherein the step of thermally reducing the silicon-containing layer comprises heating the silicon-containing layer to a temperature of from about 450° C. to about 900° C. in the presence of magnesium, aluminum, sodium, or carbon.

5. The method of claim 1, the cellulose nanocrystal template material comprising a plurality of cellulose nanocrystals, each cellulose nanocrystal having a length of from about 100 nm to about 1 µm and a cross-sectional dimension of from about 1 nm to about 100 nm.

6. The method of claim 1, the step of dispersing the template material comprising ultrasonication of the reaction medium.

7. The method of claim 1, wherein one or more of the cetyltrimethyl ammonium bromide surfactant, the ethanol, and the ammonium hydroxide catalyst are added to the reaction medium prior to the tetraethyl orthosilicate silicon precursor.

8. The method of claim 7, further comprising subjecting the reaction medium to agitation and/or sonication one or more times following addition of one or more of the cetyltrimethyl ammonium bromide surfactant, the ethanol, and the ammonium hydroxide catalyst and prior to addition of the tetraethyl orthosilicate silicon precursor.

9. The method of claim 1, wherein the process is a continuous formation process.

10. The method of claim 1, wherein each of the hollow nano-quills has an inner cross-sectional size of from about 10 nm to about 500 nm.

11. The method of claim 1, wherein each of the hollow nano-quills has a length of from about 100 nm to about 10 µm.

12. The method of claim 1, wherein each of the surrounding porous walls has a thickness of from about 2 nm to about 10 nm.

13. The method of claim 1, wherein individual pores of the surrounding porous wall have a dimension of about from about 2 nm to about 5 nm.

14. The method of claim 1, wherein the three-dimensional network comprises elemental silicon and one or more types of silicon oxide.

15. The method of claim 1, wherein the cellulose nanocrystal templating material is incorporated in the reaction medium in an amount of from about 100 mg to about 500 mg per liter of the water and ethanol combined.

16. The method of claim 1, wherein the cetyltrimethyl ammonium bromide surfactant is incorporated in the reaction medium in an amount of from 100 mg/L to 400 mg/L of the water and ethanol of the reaction medium.

\* \* \* \* \*